United States Patent [19]
Denkewicz, Jr. et al.

[11] Patent Number: 5,882,512
[45] Date of Patent: Mar. 16, 1999

[54] AUTOMATIC SWIMMING POOL CLEANERS AND ASSOCIATED COMPONENTS AND SYSTEMS

[75] Inventors: Raymond P. Denkewicz, Jr., Warwick, R.I.; Roger H. Gagnon, Framingham, Mass.; Chris A. Rice, Boca Raton, Fla.

[73] Assignee: Baracuda International Corporation, Ft. Lauderdale, Fla.

[21] Appl. No.: 964,782

[22] Filed: Nov. 5, 1997

[51] Int. Cl.⁶ ........................................................ E04H 3/16
[52] U.S. Cl. ...................... 210/169; 210/169; 210/198.1; 210/206; 210/232; 15/1.7; 422/261; 4/490; 137/268
[58] Field of Search ...................... 15/1.7, 3.5; 210/169, 210/198.1, 206, 209, 220, 416.2, 232; 422/261, 264, 275, 277; 4/490; 137/268

[56] References Cited

U.S. PATENT DOCUMENTS

| | | |
|---|---|---|
| 1,034,260 | 7/1912 | Lichtenberg . |
| 2,027,543 | 1/1936 | Lofgren . |
| 2,280,751 | 4/1942 | Davis . |
| 3,046,583 | 7/1962 | Drennan . |
| 3,229,315 | 1/1966 | Watson . |
| 3,243,830 | 4/1966 | Conrad . |
| 3,362,537 | 1/1968 | Cline . |
| 3,753,265 | 8/1973 | Wulc . |
| 4,100,641 | 7/1978 | Pansini . |
| 4,254,525 | 3/1981 | Combest . |
| 4,275,474 | 6/1981 | Woodard . |
| 4,378,254 | 3/1983 | Chauvier . |
| 4,392,953 | 7/1983 | Cornelius et al. . |
| 4,420,394 | 12/1983 | Lewis . |
| 4,642,833 | 2/1987 | Stoltz et al. . |
| 4,652,366 | 3/1987 | Brooks . |
| 4,703,955 | 11/1987 | Brooks . |
| 4,742,593 | 5/1988 | Kallenbach . |
| 4,776,954 | 10/1988 | Brooks . |
| 4,778,599 | 10/1988 | Brooks . |
| 4,835,809 | 6/1989 | Roumagnac . |
| 4,839,063 | 6/1989 | Brooks . |
| 4,863,594 | 9/1989 | Pedretti . |
| 4,939,806 | 7/1990 | Supra . |
| 4,957,623 | 9/1990 | Henzlik . |
| 5,014,382 | 5/1991 | Kallenbach . |
| 5,315,728 | 5/1994 | Atkins . |
| 5,317,776 | 6/1994 | DeMoura . |
| 5,317,777 | 6/1994 | Stoltz . |
| 5,337,434 | 8/1994 | Erlich . |
| 5,351,709 | 10/1994 | Vos . |
| 5,352,369 | 10/1994 | Heinig, Jr. . |
| 5,400,467 | 3/1995 | Hwang . |
| 5,450,645 | 9/1995 | Atkins . |
| 5,546,982 | 8/1996 | Clark et al. . |
| 5,660,802 | 8/1997 | Archer et al. . |
| 5,720,068 | 2/1998 | Clark et al. . |
| 5,772,896 | 6/1998 | Denkewicz et al. . |

FOREIGN PATENT DOCUMENTS

| | | |
|---|---|---|
| 0357810 | 3/1990 | European Pat. Off. . |
| 0380421 | 8/1990 | European Pat. Off. . |
| 0543387 | 5/1993 | European Pat. Off. . |
| 2365935 | 5/1978 | France . |
| 5-49568 | 3/1993 | Japan . |
| 139590 | 3/1953 | Sweden . |
| WO 96/13644 | 5/1996 | WIPO . |

OTHER PUBLICATIONS

Sev. No. 08/838513, Apr. 8, 1997, Van Der Meyden et al.

*Primary Examiner*—Jay H. Woo
*Assistant Examiner*—Fred Prince
*Attorney, Agent, or Firm*—Dean W. Russell; Kilpatrick Stockton LLP

[57] ABSTRACT

Systems and apparatus for cleaning swimming pools or other vessels are disclosed. Exemplary systems may include an automatic swimming pool cleaner adapted not only to filter debris from water mechanically, but to dispense water sanitizing chemicals as well. Fluid drawn into the cleaner in operation contacts or otherwise passes through media containing the chemicals, purifying the fluid at least partially within the cleaner itself.

27 Claims, 6 Drawing Sheets

AUTOMATIC SWIMMING POOL CLEANERS AND ASSOCIATED COMPONENTS AND SYSTEMS

FIELD OF THE INVENTION

This invention relates to apparatus for cleaning vessels such as swimming pools and more particularly to automatic swimming pool cleaners and associated components and systems from or through which chemical cleaning compositions are dispensed.

BACKGROUND OF THE INVENTION

Multitudes of patents exist for automatic swimming pool cleaners and components of such cleaners. U.S. Pat. Nos. 4,642,833 to Stoltz, et al. and 4,742,593 to Kallenbach, for example, illustrate and describe various pool cleaners and valves useful in their operation. U.S. Pat. No. 5,014,382 to Kallenbach discloses other such pool cleaners, while U.S. Pat. No. 5,315,728 to Atkins illustrates certain components of automatic pool cleaners. U.S. Pat. Nos. 5,317,777 to Stoltz and 5,450,645 to Atkins describe yet other exemplary pool cleaners and components.

U.S. Pat. No. 4,835,809 to Roumagnac details, in some embodiments, an automatic swimming pool cleaner designed to be connected to the "water recycle" or "return" mouth of a swimming pool. This cleaner, generically categorized as a "pressure-side" cleaner, receives pressurized water entering the pool through the return mouth. The pressurized water in turn enters the cleaner, passes through an injection orifice, and is exhausted through a tube or pipe to propel the cleaner about surfaces of a pool. The flow of pressurized water within the cleaner additionally lowers the pressure therein, aspirating debris-laden water into an orifice denoted the "aspiration mouth." From the aspiration mouth the debris-laden water passes through a filter inside the cleaner (thus removing debris from the water), thereafter joining the pressurized water being exhausted through the tube or pipe.

U.S. Pat. No. 5,546,982 to Clark, et al. discloses improved versions of cleaners of the Roumagnac patent. An automatic pool cleaner described in the Clark, et al. patent includes a series of curved wipers protruding from its bottom. The wipers spiral inward toward a central inlet (or "aspiration mouth" in the nomenclature of the Roumagnac patent), causing debris-laden water to flow in the form of a vortex about the inlet when the cleaner operates. As with other existing automatic swimming pool cleaners, those illustrated in the Clark, et al. patent remove the debris from the flowing water mechanically.

None of these automatic pool cleaners thus operates to sanitize or otherwise treat pool water chemically. Instead, pool water is traditionally treated chemically through placing chlorine-containing tablets in the pump assembly of the pool, for example, and by pouring algicide or other liquids (or granulated solids) directly into the pool volume. Positioning chlorine tablets in a pump assembly can be both time consuming and tedious, however, often prompting consumers to forego the process entirely and simply drop the tablets in the skimmer baskets of their pools. Alternatively, commercial versions of purification vessels such as those described in U.S. Pat. No. 5,660,802 to Archer, et al. may be plumbed externally of the pools, often adjacent swimming pool pumps. While these latter vessels are useful in sanitizing pool water, none contemplates automatically treating water both chemically and mechanically within the pool itself.

SUMMARY OF THE INVENTION

The present invention, by contrast, provides an automatic swimming pool cleaner adapted to dispense sanitizing chemicals as well. Exploiting the significant flow of water through the body of a cleaner, the invention interposes a supply of sanitizing chemicals between an inlet and outlet of the cleaner. The water is thus treated at least partially within the body of the cleaner; in some cases, moreover, the sanitizing chemicals are entrained within the fluid exiting the cleaner, dispersing it more widely throughout the volume of the pool. In embodiments of automatic pool cleaners containing internal filtering devices, concurrent mechanical filtration of the water may occur as well.

Because debris is intended to be trapped by the filter and retained within the body of the cleaner, performance of the cleaner ultimately may degrade as the filter loads with debris. Cleaners of the present invention may thus include mechanisms facilitating temporary removal of the filter for cleaning (or, if desired, permanent removal and replacement of the filter). In some embodiments, the upper portion of the body is likewise removable to allow access to the (internal) filter.

Similarly, because many water treatment chemicals are consumed over the course of time, the dispenser within the body of the cleaner must periodically be replenished or replaced. Cleaners consistent with the present invention readily permit such replenishment or replacement when the upper portion of the body is removed. In some versions of the invention, the dispenser itself may be removed from the body of the cleaner; additionally or alternatively, the dispenser may be opened while within the cleaner to permit addition of sanitizing chemicals.

Certain embodiments of the invention contemplate utilizing a hollow housing, generally in the form of a ring but through which fluid may flow, positioned within the upper portion of the cleaner body. Placed in turn within the housing is the sanitizing media, which may be manufactured into pellets, sited in a porous bag or other material, or otherwise formed so as to permit generally its retention therein. The housing further may include a hatch to permit access to its hollow interior, typically to replenish the chemical supply therein.

Ring-shaped versions of the housing additionally may include resilient clips spaced about the circumference of their inner surfaces. Such versions, designed generally for use in connection with cleaners similar to those of the Clark, et al. patent, may then simply be pressed onto the central ballast within the cleaner body. The clips will engage the ballast and retain the housing in place relative to the remainder of the interior of the body. Doing so positions the housing in the flow of water, interposing it between the central inlet of the cleaner and the exhaust.

Although embodiments of the housing are especially adapted for use with cleaners like those disclosed in the Clark, et al. and other patents, they may function satisfactorily in other cleaners as well. The invention is thus not necessarily limited to automatic swimming pool cleaners denoted "pressure-side" cleaners, but additionally or instead may be used in appropriate circumstances in "suction-side," electric, and other pool cleaners as well. Other alternate embodiments of the housing may be positioned in hoses or equipment attached to automatic swimming pool cleaners or pools rather than in the cleaners themselves. Likewise, the invention described herein may in some cases be used in connection with cleaning vessels other than pools; its preferred purpose, nonetheless, is to promote more effective cleaning and sanitizing of water in swimming pools.

It is therefore an object of the present invention to provide an automatic swimming pool cleaner from or through which water sanitizing chemicals may be dispensed.

It is also an object of the present invention to provide an automatic swimming pool cleaner in which a supply of sanitizing chemicals is positioned in the flow path of fluid within the cleaner.

It is another object of the present invention to provide an automatic swimming pool cleaner which treats, or otherwise interacts with, water both mechanically and chemically.

It is a further object of the present invention to provide an automatic swimming pool cleaner in which both mechanical filters, if present, and chemical dispensers may be accessed or removed for cleaning, replacement, or replenishment.

It is, moreover, an object of the present invention to provide an automatic swimming pool cleaner in which the chemical dispenser is in the form of a ring having a hollow area through which water may flow and sanitizing chemicals may be retained.

It is yet another object of the present invention to provide a cleaning system for a pool or other vessel which utilizes the concepts described herein, regardless of the mechanism or device through which chemicals are dispensed.

Other objects, features, and advantages of the present invention will become apparent with reference to the remainder of the text and the drawings of this application.

DETAILED DESCRIPTION

Figure 1:
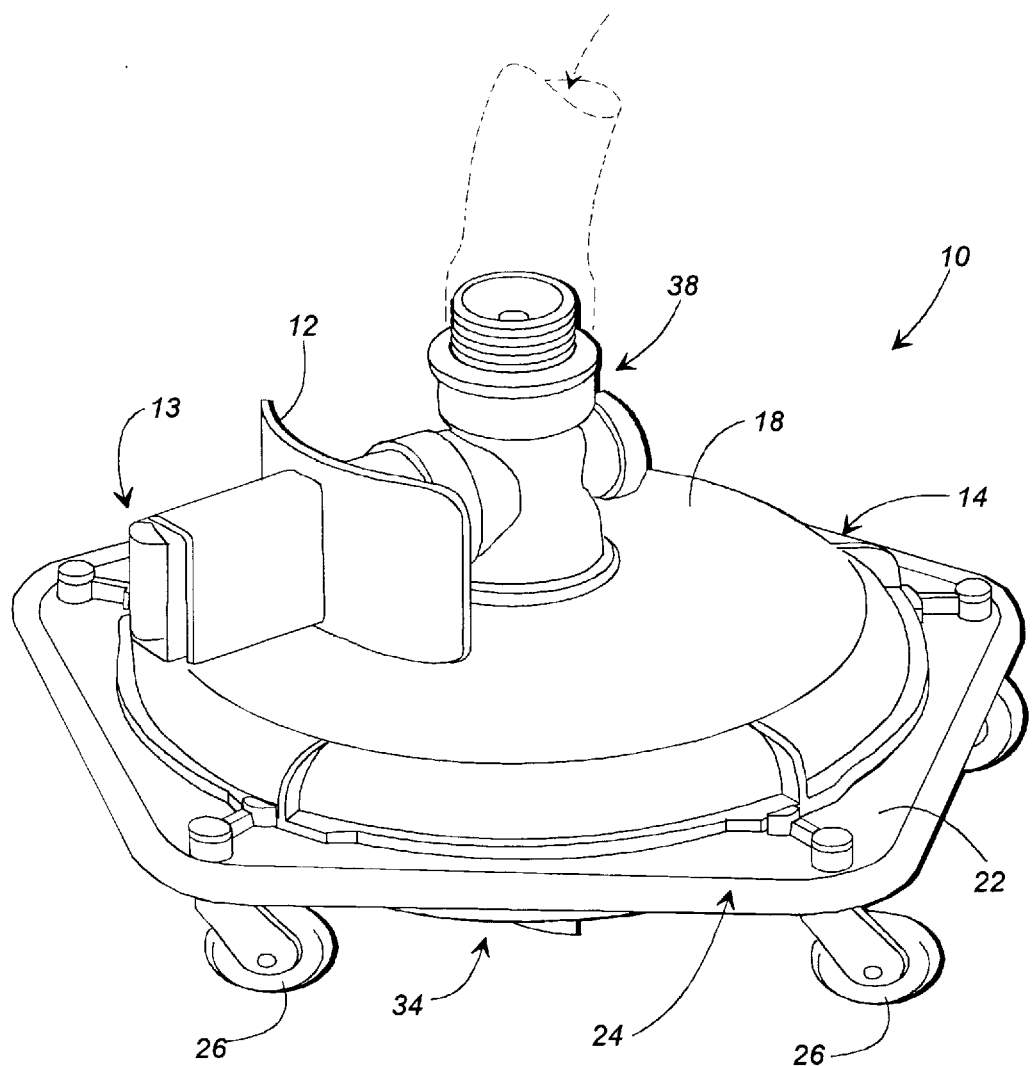
FIG. 1 is a perspective view of the exterior of an exemplary automatic swimming pool cleaner useful in connection with or as part of the present invention.

FIG. 1 illustrates an exemplary automatic swimming pool cleaner 10. FIG. 1 is, in many respects, similar to the corresponding numbered figure of the Clark, et al. patent. It does, however, include resistance plate 12 and rudder assembly 13, features which also are disclosed in co-pending U.S. patent application Ser. No. 08/838,513.

Body 14 of exemplary cleaner 10 comprises upper section 18 and lower section 22, which sections are fitted together in use. Shown in FIG. 1 attached to lower section 22 about its periphery 24 are casters 26, while wipers 30 (FIG. 2) protrude from the bottom 34 of lower section 22. Connected to upper section 18 of body 14 is a hydro-injector 38 as described and illustrated in the Roumagnac patent. In use, cleaner 10 moves about a swimming pool or other vessel to be cleaned generally like the device of the Roumagnac patent.

Figure 2:
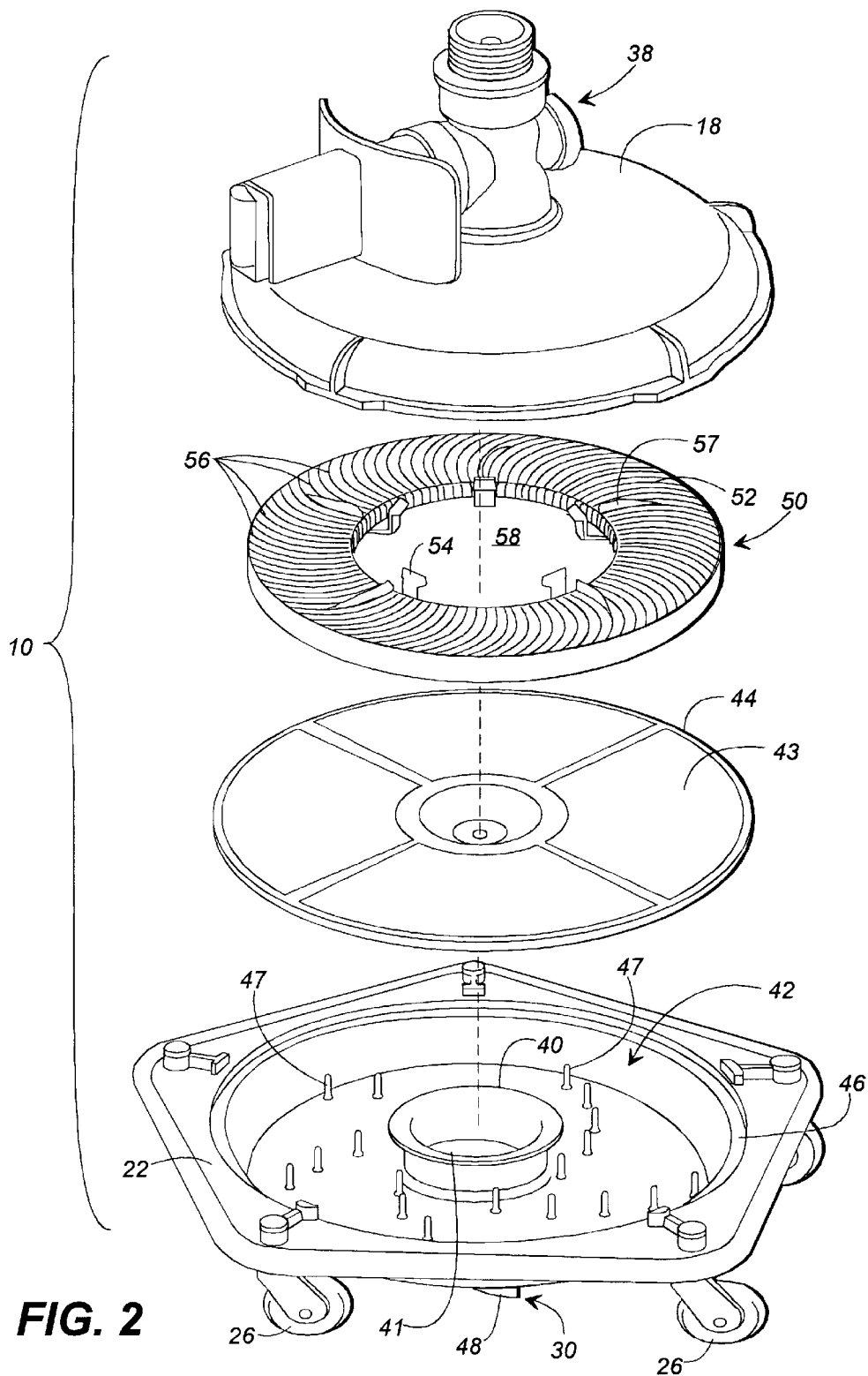
FIG. 2 is an exploded perspective view of the automatic swimming pool cleaner of FIG. 1.

FIG. 2 details additional aspects of cleaner 10. Included among features of exemplary cleaner 10 is throat 40, which defines central inlet 41 to interior 42 of body 14. Shown as possibly included within interior 42 is filter 43, which may (but need not necessarily) be a metal or plastic screen or mesh. Filter 43 of FIG. 2 is generally circular in shape and of diameter approximately equal to that of interior 42. Its peripheral frame 44 thus may simply be placed on internal ledge 46 of lower section 22, with ledge 46 and upper section 18 holding frame 44 is position when cleaner 10 is in use. Those skilled in the relevant field will recognize that objects other than screens may be used as filter 43, however, and may be shaped other than circularly. Nonetheless filter 43, if present, may serve as a mechanical device for removing debris from fluid entering body 14 through inlet 41 and retaining the debris within interior 42.

Also shown in FIG. 2 are connectors 47, which may be integrally formed with blades 48 to comprise wipers 30. As noted in the Clark, et al. patent, connectors 47 assist in securing wipers 30 vis-a-vis lower section 22. FIG. 2 additionally illustrates a chemical container such as dispenser 50 which, like filter 43, may be positioned within interior 42 of body 14. In the embodiment of cleaner 10 detailed in FIG. 2, dispenser 50 is interposed between filter 43 and hydro-injector 38 in the flow path of fluid entering body 14 through inlet 41. By so positioning dispenser 50, it receives only fluid previously strained by filter 43 and thus encounters a lesser quantity of debris than were it to precede filter 43 in the fluid flow path. Filter 43 may be otherwise positioned within body 14 as appropriate or desired, however.

Figure 3:
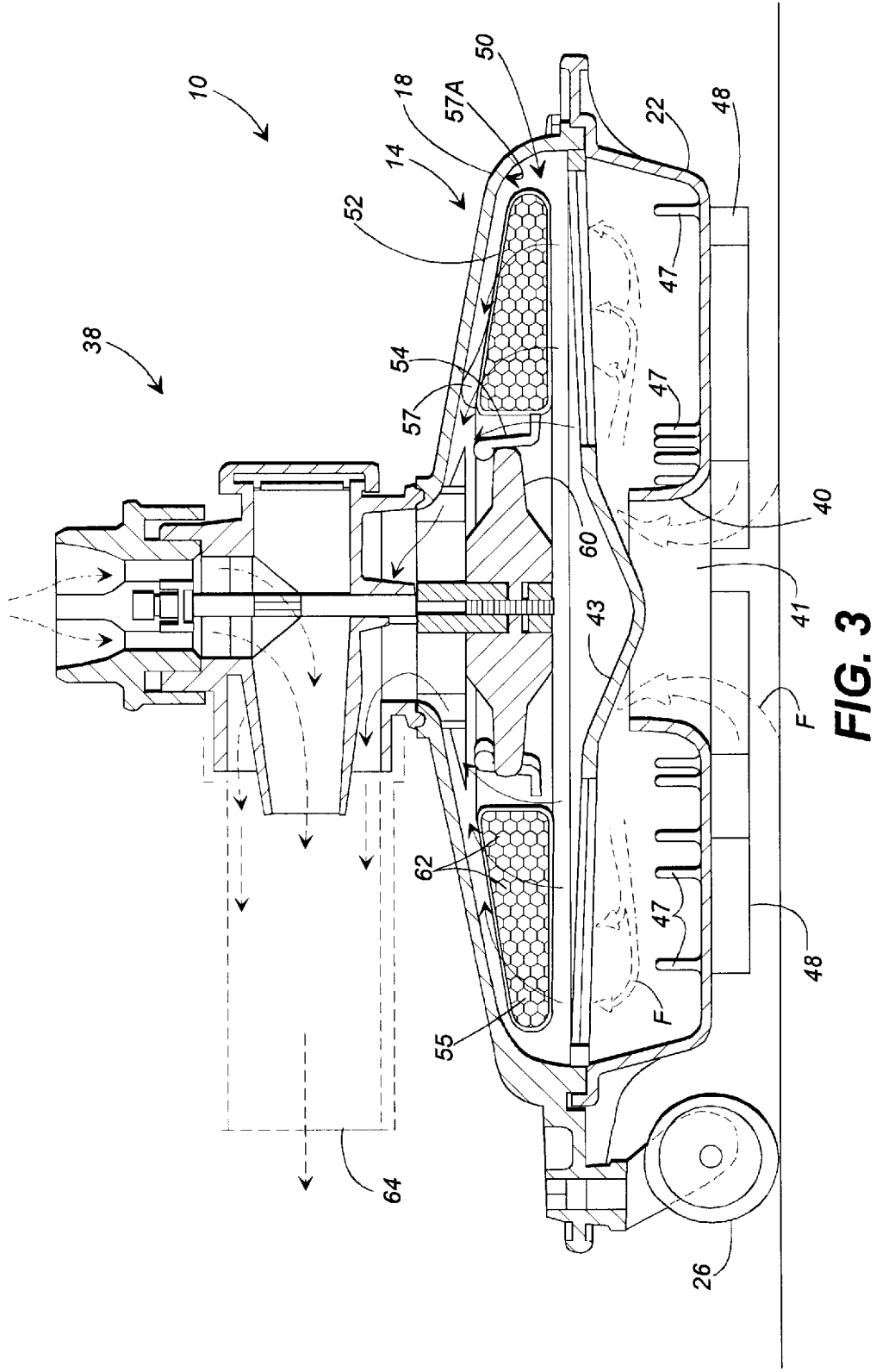
FIG. 3 is a cross-sectional view of the automatic swimming pool cleaner of FIG. 1.

In FIGS. 2–3, dispenser 50 is illustrated as comprising housing 52 and clip assemblies 54. Housing 52, which in some embodiments is made of plastic material, defines cavity 55 and includes multiple openings 56 through which fluid may flow. It additionally may be formed in the shape of a disc having one or more spacers 57 extending therefrom (to separate housing 52 from the inner surface 57A of upper section 18 and permit fluid flow therebetween) and a central opening 58.

Protruding about the inner circumference into opening 58 are the assemblies 54, which in use function to attach housing 52 to ballast 60 or some other appropriate portion of upper section 18 of body 14. Assemblies 54 too may be made of plastic or any other material adapted to permit flexure as dispenser 50 is fitted onto ballast 60. During this procedure, the assemblies 54 shown in FIGS. 2–3 are effectively forced outward toward housing 52 as they encounter ballast 60, subsequently snapping inward to the positions detailed in FIG. 3. When dispenser 50 is to be removed, pulling it away from upper body 14 again forces assemblies 54 outward toward housing 52, freeing the housing 52 from ballast 60.

Contained within cavity 55 of housing 52 is media 62. Media 62 is designed to sanitize fluid (typically water) entering and exiting via openings 56 and in the interim flowing through housing 52. It thus may include one or more chemicals adapted to sanitize or purify water either upon contact or otherwise as, for example, through erosion and transport elsewhere in a vessel (or both). Chemicals suitable for use as media 62 include, but are not limited to, compositions containing chlorine, bromine, or a metal such as silver, zinc, or copper, as well as those described in co-pending U.S. patent application Ser. No. 08/628,405, (now U.S. Pat. No. 5,772,896) and U.S. Pat. No. 5,352,369 to Heinig, Jr. Media 62 of FIG. 3 comprise pellets or particles whose size—at least initially—is typically larger than the width of openings 56. Thus, once placed in cavity 55 of housing 52, media 62 can be retained within the housing 52 while dispenser 50 is installed in body 14 of cleaner 10.

As noted above and illustrated in FIG. 3, fluid F enters cleaner 10 through inlet 41, first encountering filter 43, which removes some or all of the debris entrained therein. Fluid F, as (mechanically) filtered, then flows through cavity 55 of housing 52, contacting media 62 so as to sanitize or purify fluid F chemically. The filtered and sanitized fluid F is then conveyed to exhaust 64, from which it reenters the pool or other vessel from which it came. As configured in FIG. 3, cleaner 10 thus both mechanically and chemically improves the quality of the water or other fluid flowing through it.

Figure 4:
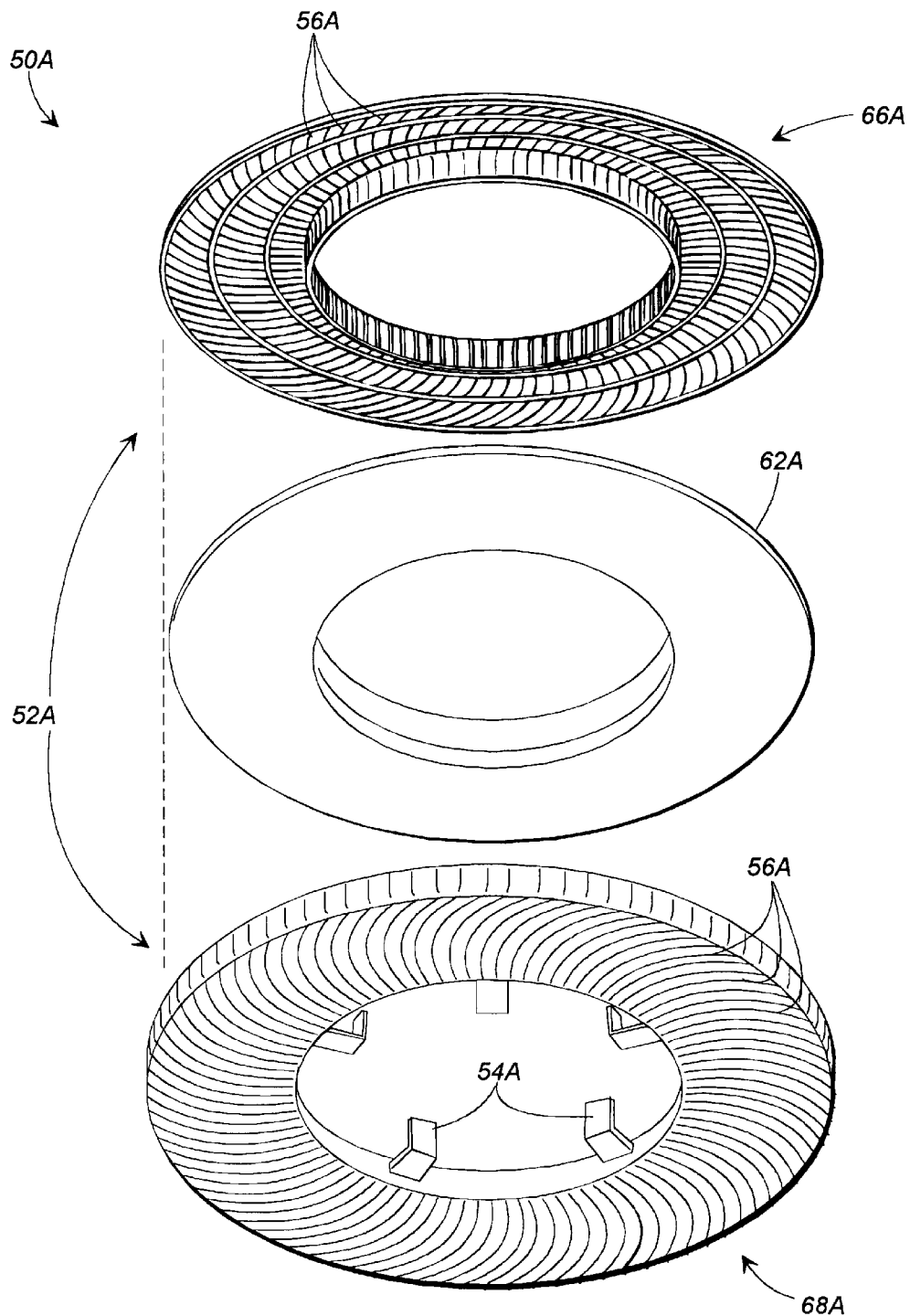
FIG. 4 is an exploded perspective view of a chemical dispensing mechanism useful in connection with or as part of the present invention.
Figure 5:
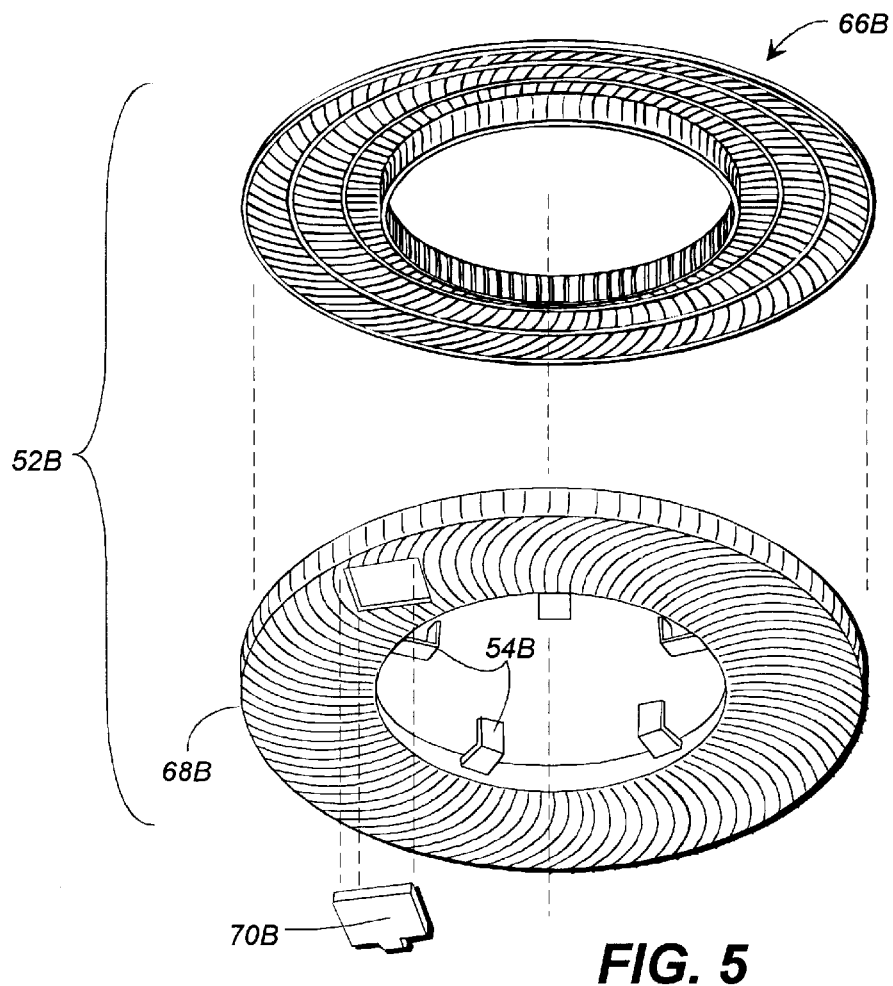
FIG. 5 is an exploded perspective view of an alternate housing for the chemical dispensing mechanism of FIG. 4.
Figure 6:
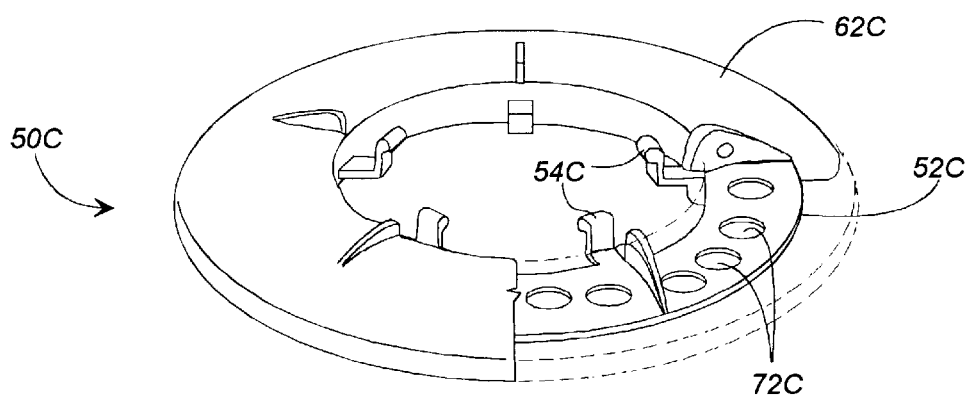
FIG. 6 is a perspective, partially cut-away view of another alternate chemical dispensing mechanism.

FIGS. 4–6 illustrate various alternative designs of dispenser 50. FIG. 4, for example, details a dispenser 50A having a housing 52A and clip assemblies 54A as discussed above. In this embodiment housing 52A comprises upper portion 66A and lower portion 68A, which may be separated between uses. When fitted together, upper and lower portions 66A and 68A define a cavity (like cavity 55) into which media 62A may be placed. If not pellets or particles sized as addressed above, media 62A may, in some circumstances, be a toroidal solid as per FIG. 4. Alternatively, media 62A could comprise a porous bag or other appropriate container for chemicals shaped so as to fit within the cavity defined by upper portion 66A and lower portion 68A of housing 52A. Because the upper and lower portions 66A and 68A each include openings 56A, fluid such as water is not prevented from flowing into the cavity of housing 52A in which media 62A is contained.

Shown in FIG. 5 is dispenser 50B, which too may include housing 52B and an attachment means or mechanism such as clip assemblies 54B. Like housing 52A, housing 52B may comprise upper portion 66B and lower portion 68B, which portions 66B and 68B are fitted together (again to form a cavity similar to cavity 55) for use. As illustrated in FIG. 5, lower portion 68B additionally can contain a door or other mechanism, denoted hatch 70B, for accessing the cavity so formed. In this embodiment, upper and lower portions 66B and 68B may be permanently connected, with hatch 70B used to access the cavity to fill or replenish it with one or more sanitizing chemicals such as media 62. With dispenser 50B such filling or replenishment is likely most easily accomplished by inverting housing 52B (as well as upper section 18 if housing 52B remains attached to ballast 60 during the process), thereby placing hatch 70B above the cavity.

Yet another alternative design of dispenser 50 appears in FIG. 6. This design, denoted dispenser 50C, has as its "housing" a frame 52C to which clip assemblies 54C or other suitable means for attachment to cleaner 10 may be connected. Formed around frame 52C is media 62C, which again may be a toroidal solid. Frame 52C thus acts as a carrier, or internal skeleton, for the solid media 62C, which typically will erode over time as a result of repeated contact with water. Defined by frame 52C are spaced openings 72C to facilitate fluid flow through the frame 52C as chemicals of media 62C are dispensed. Again, however, those skilled in the art will recognize that dispenser 50 may be configured in manners other than pictured in FIGS. 4–6 as necessary or desired.

Figure 7:
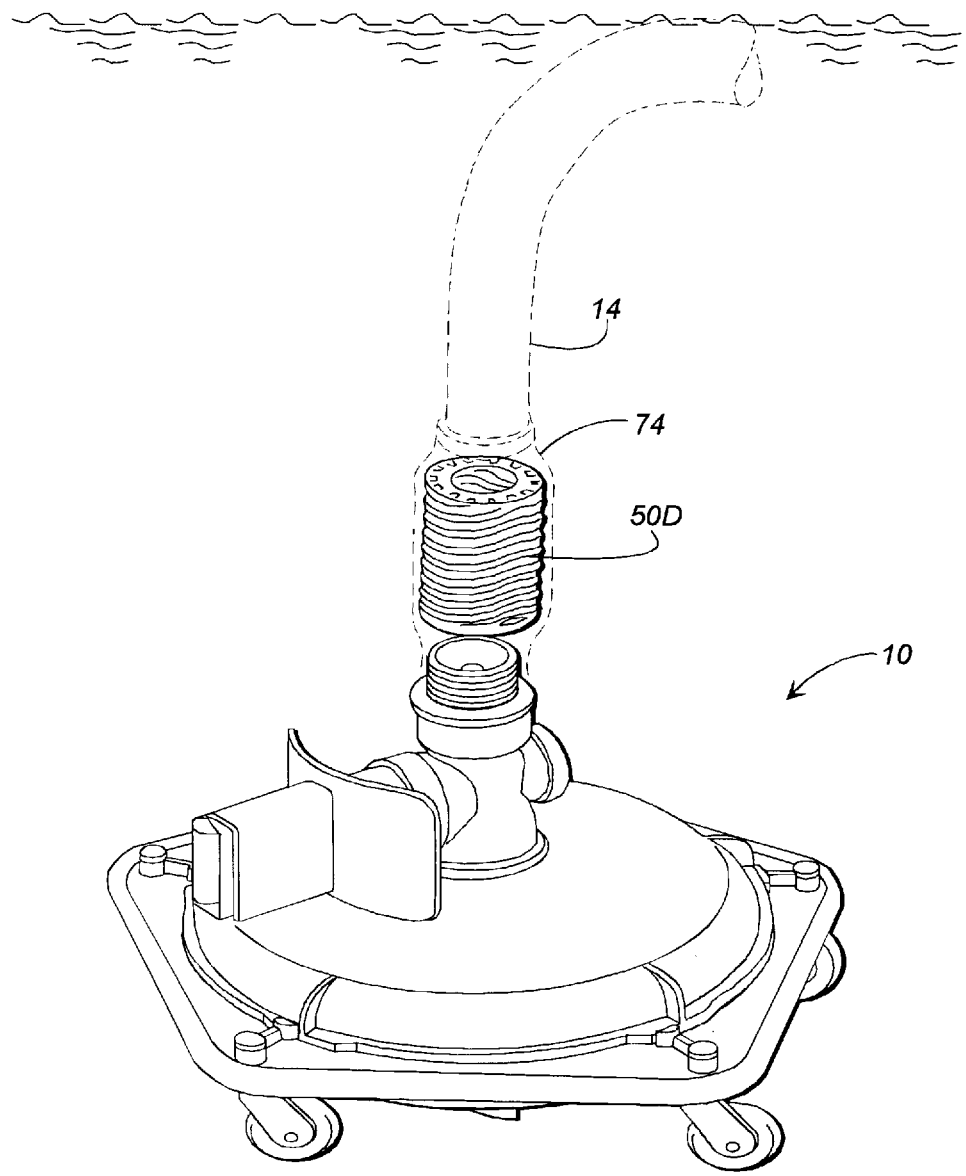
FIG. 7 is a perspective, partially schematicized view of yet another alternate chemical dispensing mechanism useful in connection with or as part of the present invention.

FIG. 7, finally, shows an exemplary dispenser 50D contained within an adaptor 74 connecting hose H and cleaner 10. In this version pressurized fluid flowing from a return mouth of a vessel enters hose H, through which the fluid is conveyed to adaptor 74. Within adaptor 74 the pressurized fluid encounters dispenser 50D, which assists in its chemical sanitization. After passing through adaptor 74, the fluid enters cleaner 10 via hydro-injector 38 and is returned to the vessel through exhaust 64. Cleaner 10 may concurrently filter debris from fluid within the vessel, although in this instance at any particular point in time the volume of fluid mechanically filtered would not be the same as that being sanitized. If exemplary cleaner 10 were, alternatively, a "suction-side" cleaner, fluid aspirated into the cleaner would pass through adaptor 74 for sanitization and thence through hose H to a filter or other mechanism for removing debris entrained therein. If appropriately sized, additionally, dispenser 50D may be inserted directly into a length of hose H rather than being positioned within adaptor 74.

The following (non-limiting) examples evidence the performance of an exemplary cleaner with and without a chemical dispenser contained therein:

EXAMPLE 1

Randomly dispersed onto the bottom of a 24'×15' (oval) above-ground swimming pool were 1.82 pounds of cylindrical polyacetal pellets (3 mm diameter; 3 mm length). A pressure-side automatic pool cleaner was then placed into operation in the water of the pool for one hour, after which it was removed from the pool and opened and its interior was inspected to determine the amount (by weight) of the pellets it filtered from the water during the one-hour period. The test was repeated nine additional times, and the results of the ten trials follow:

| Trial No. | Lbs. of Pellets Filtered | Percentage of Total Pellet Weight |
| --- | --- | --- |
| 1 | 1.45 | 80 |
| 2 | 1.38 | 76 |
| 3 | 1.28 | 70 |
| 4 | 1.37 | 75 |
| 5 | 1.30 | 71 |
| 6 | 1.29 | 71 |
| 7 | 1.23 | 68 |
| 8 | 1.26 | 69 |
| 9 | 1.34 | 75 |
| 10 | 1.34 | 74 |
| Average: | 1.32 | 74 |

Five additional trials were then conducted as described above, except that a cartridge containing two hundred grams of water purification material was placed within the body of the cleaner. The results of these trials follow:

| Trial No. | Lbs of Pellets Filtered | Percentage of Total Pellet Weight |
| --- | --- | --- |
| 11 | 1.40 | 77 |
| 12 | 1.19 | 65 |
| 13 | 1.36 | 75 |
| 14 | 1.38 | 76 |
| 15 | 1.20 | 66 |
| Average: | 1.31 | 72 |

Comparing the results of the first and second sets of trials demonstrates that water purification material can be added to the cleaner without significant degradation of cleaner performance.

EXAMPLE 2

Trials similar to those of EXAMPLE 1 were conducted except that two pounds of the cylindrical pellets were randomly dispersed onto the pool bottom. Results of these further trials follow:

| Trial No. | Lbs. of Pellets Filtered |
|---|---|
| 16 | 0.82 |
| 17 | 1.10 |
| 18 | 0.80 |
| 19 | 0.84 |
| 20 | 0.90 |
| 21 | 0.98 |
| 22 | 0.98 |
| 23 | 1.04 |
| 24 | 1.10 |
| Average: | 0.95 |

Nine additional trials were then conducted as described above, except that a cartridge containing two hundred grams of water purification material was placed within the body of the cleaner. The results of these trials follow:

| Trial No. | Lbs. of Pellets Filtered |
|---|---|
| 25 | 0.80 |
| 26 | 0.64 |
| 27 | 0.88 |
| 28 | 0.88 |
| 29 | 0.86 |
| 30 | 1.00 |
| 31 | 0.74 |
| 32 | 0.92 |
| 33 | 0.62 |
| Average: | 0.82 |

Comparing the results of the first and second sets of trials again demonstrates that water purification material can be added to the cleaner without significant degradation of cleaner performance.

The foregoing is provided for purposes of illustrating, explaining, and describing embodiments of the present invention. Modifications and adaptations to these embodiments will be apparent to those skilled in the art and may be made without departing from the scope or spirit of the invention. Applicants by this reference also incorporate herein the entireties of U.S. Pat. Nos. 4,835,809 to Roumagnac, 5,546,982 to Clark, et al., and 5,352,369 to Heinig, Jr. and U.S. patent application Ser. Nos. 08/838,513 and 08/628,405.

What is claimed is:

1. An automatic swimming pool cleaner for use in a swimming pool, comprising:
    a. a body (i) automatically displaceable within the swimming pool and (ii) through which water may flow to or from an attached hose; and
    b. means, contained within the body, for chemically treating the water flowing therethrough to or from the hose.

2. An automatic swimming pool cleaner according to claim 1 further comprising means, contained within the body, for mechanically filtering water flowing therethrough.

3. An automatic swimming pool cleaner according to claim 1, in which the treating means comprises:
    a. a chemical media; and
    b. means for positioning the chemical media within the body.

4. An automatic swimming pool cleaner according to claim 3 in which the positioning means comprises:
    a. a housing defining a cavity within which the chemical media is placed; and
    b. means, connected to the housing, for detachably attaching the housing to the body.

5. An automatic swimming pool cleaner according to claim 3 in which the positioning means comprises:
    a. a frame for supporting the chemical media; and
    b. means, connected to the frame, for detachably attaching the frame to the body.

6. An automatic swimming pool cleaner according to claim 4 in which the housing defines a plurality of openings through which water may flow.

7. An automatic swimming pool cleaner according to claim 6 in which the housing further defines a hatch providing access to the cavity.

8. An automatic swimming pool cleaner according to claim 3 in which the chemical media comprises a plurality of particles formed of a composition containing at least one element selected from the group consisting of silver, copper, and zinc.

9. An automatic swimming pool cleaner for use in a swimming pool, comprising:
    a. a body automatically displaceable within the swimming pool and defining:
        i. a first inlet for receiving pressurized water;
        ii. a second inlet for receiving water to be cleaned; and
        iii. an outlet for exhausting the water received in the first and second inlets;
    b. means, contained within the body, for filtering the water received in the second inlet; and
    c. a chemical dispenser removably contained within the body and interposed between the filtering means and the outlet.

10. An automatic swimming pool cleaner according to claim 9 further comprising a ballast contained within the body and in which the chemical dispenser comprises:
    a. a housing defining a cavity; and
    b. means for detachably attaching the housing to the ballast.

11. An automatic swimming pool cleaner according to claim 10 in which the attaching means comprises a plurality of clips.

12. An automatic swimming pool cleaner according to claim 11 in which the chemical dispenser further comprises water-sanitizing media placed within the cavity.

13. An automatic swimming pool cleaner according to claim 12 in which the water-sanitizing media includes a plurality of silver-containing particles.

14. A system for treating fluid contained in a vessel designed to receive humans, comprising:
    a. a cleaner body automatically displaceable within the vessel and defining an interior region;
    b. means for causing fluid within the vessel to flow at least through the interior region of the cleaner body;
    c. means for mechanically filtering the flowing fluid to remove debris entrained therein; and
    d. means for chemically sanitizing the flowing fluid; and
    in which the sanitizing means is either (i) connected so as to allow fluid communication with the cleaner body or (ii) located within the interior region of the cleaner body.

15. A system according to claim 14 in which the filtering means is located within the interior region of the cleaner body.

16. A system according to claim 15 in which the sanitizing means is located within the interior region of the cleaner body.

17. A system according to claim 16 in which the filtering and sanitizing means are adapted for removal from the interior region of the cleaner body for cleaning or refilling.

18. An automatic swimming pool cleaner according to claim 3 in which the chemical media comprises a plurality of particles formed of a composition containing at least one element selected from the group consisting of chlorine and bromine.

19. An automatic swimming pool cleaner according to claim 12 in which the water-sanitizing media includes chlorine or bromine.

20. An automatic swimming pool cleaner according to claim 10 in which the chemical dispenser further comprises at least one spacer extending from the housing.

21. An automatic swimming pool cleaner according to claim 1 in which (i) the swimming pool has a return mouth and (ii) the body comprises means for receiving the hose to allow water to flow into the body from the return mouth.

22. An automatic swimming pool cleaner according to claim 1 further comprising means for facilitating automatic displacement of the body within the pool.

23. An automatic swimming pool cleaner according to claim 22 in which the displacement-facilitating means comprises a plurality of casters.

24. A system according to claim 14 in which the vessel is a swimming pool and the fluid contained therein is water, further comprising a hose connecting the sanitizing means and the cleaner body.

25. A system according to claim 24 in which the means for causing fluid within the vessel to flow at least through the interior region of the cleaner body comprises means for aspirating water from the swimming pool into the cleaner body.

26. A system according to claim 14 in which the sanitizing means comprises sanitizing media positioned so as to be contacted by the flowing fluid.

27. A system according to claim 24 in which the sanitizing means comprises sanitizing media positioned in line with the hose so as to be contacted by the flowing fluid.

* * * * *